United States Patent [19]

Tarcy

[11] Patent Number: 4,950,560
[45] Date of Patent: Aug. 21, 1990

[54] ALUMINUM ALLOY AND ASSOCIATED ANODE AND BATTERY

[75] Inventor: Gary P. Tarcy, Pittsburgh, Pa.

[73] Assignee: Aluminum Company of America, Pittsburgh, Pa.

[21] Appl. No.: 226,480

[22] Filed: Aug. 1, 1988

[51] Int. Cl.$^5$ .................. H01M 4/36; H01M 6/20; C22C 21/00
[52] U.S. Cl. .................. 429/27; 429/103; 429/218; 420/528; 420/540; 420/554
[58] Field of Search .......... 429/27, 103, 218; 420/528, 540, 554

[56] References Cited

U.S. PATENT DOCUMENTS

| | | |
|---|---|---|
| 3,186,836 | 6/1965 | Pryor et al. . |
| 3,189,486 | 6/1965 | Pryor et al. . |
| 3,281,239 | 10/1966 | Reding et al. ............ 420/528 |
| 3,282,688 | 11/1966 | Pryor et al. . |
| 3,368,952 | 2/1968 | Pryor et al. . |
| 3,379,636 | 4/1968 | Reding et al. ............ 420/528 X |
| 3,393,138 | 7/1968 | Hine . |
| 3,513,031 | 5/1970 | Zaromb . |
| 3,635,765 | 1/1972 | Greenberg ............ 429/103 X |
| 4,098,606 | 7/1978 | Despic et al. ............ 420/528 |
| 4,150,204 | 4/1979 | Moden et al. . |
| 4,751,086 | 6/1988 | Jeffrey et al. ............ 420/528 X |

OTHER PUBLICATIONS

Yatsenko, S. P. et al., "Study of the Phase Separation Region in the Aluminum–Gallium–Indium System", *Tezisy Nauchn. Soobshch. Vses. Konf. Str. Svoistvati Met. Shlakovykh Rasplavov*, 3rd, 1978, vol. 2, pp. 235–237.
Yatsenko et al., *Chemical Abstracts*, vol. 93, No. 12027, 1980.
"Comprehensive Treatise of Electrochemistry", vol. 2: *Electrochemical Processing*, Chapter 1, Phenum Press, (1981).

*Primary Examiner*—Stephen J. Kalafut
*Attorney, Agent, or Firm*—Douglas G. Glantz; Arnold B. Silverman

[57] ABSTRACT

The present invention provides a eutectic aluminum base alloy and anode made therefrom which may include at least two elements from the group consisting of scandium, bismuth, cadmium, gallium, indium, lead, mercury, thallium, tin, and zinc. The alloying elements are present in the aluminum alloy in such quantity that they are at least in part liquid at the sites of local reaction on the anode. The preferred alloying components are eutectics of the elements. The alloys and anodes have a high overpotential for water reduction. The purity of the aluminum is preferably at least about 99.99%. Preferred compositions are aluminum-gallium-indium, aluminum-gallium-indium-tin, aluminum-gallium-indium-tin-zinc, aluminum-gallium-indium-zinc, aluminum-gallium-zinc, aluminum-gallium-tin, and aluminum-bismuth-cadium-indium-lead-tin. The alloying elements may preferably be present in a total amount of about 0.01 to 3.0 percent based on total alloy weight. In an alternate embodiment a molten anode may be employed.

43 Claims, 1 Drawing Sheet

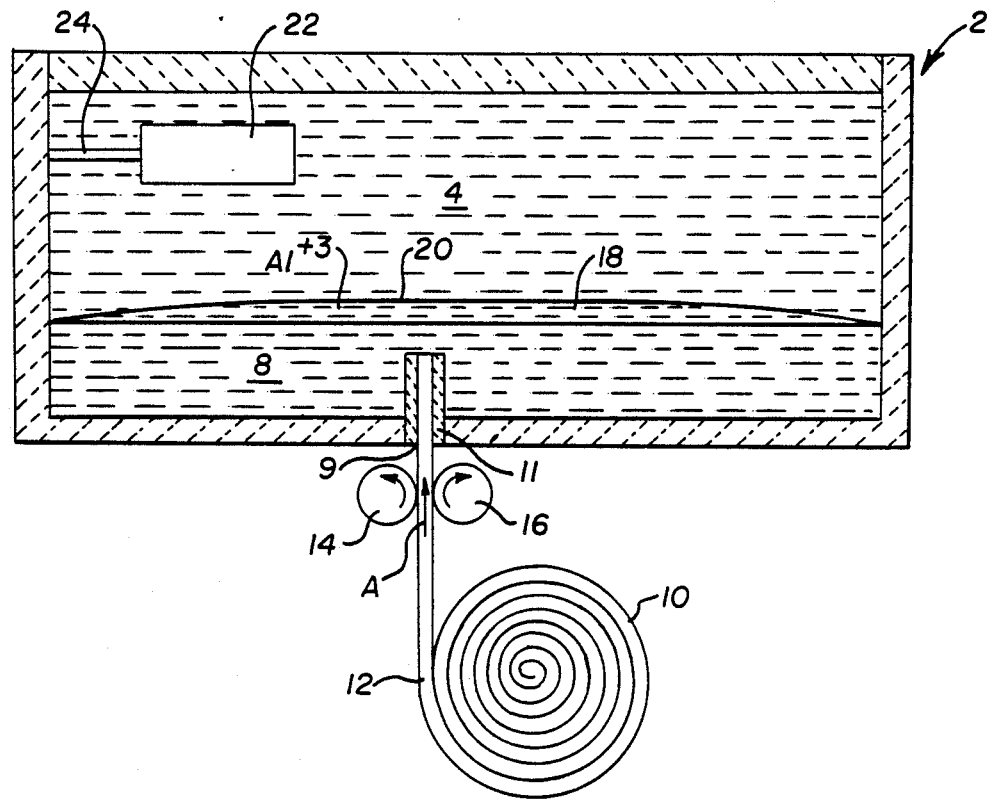

ALUMINUM ALLOY AND ASSOCIATED ANODE AND BATTERY

BACKGROUND OF THE INVENTION

1. Field Of The Invention

This invention relates to an aluminum alloy, and more specifically an alloy usable in an aluminum anode.

2. Description of the Prior Art

The use of aluminum alloys in batteries is well known. Aluminum is a preferred material for battery anodes because of its high energy content and low cost. However, problems with voltaic efficiency and coulombic inefficiency have prevented wide commercial use of these aluminum anodes. See U.S. Pat. No. 3,513,031.

It is preferred that aluminum air batteries have high voltage and high coulombic efficiency. However, one of these characteristics is usually sacrificed at the cost of the other characteristic. The use of gallium to increase voltage in aluminum anode alloys is well known. See U.S. Pat. No. 3,393,138 and U.S. Pat. No. 4,150,204. Many aluminum alloys incorporate tin in order to create higher galvanic currents. See U.S. Pat. Nos. 3,282,688, 3,368,952, 3,186,836 and 3,189,486.

It has been known that aluminum reacts with water to release hydrogen. This is undesirable in the battery environment. With respect to this specific problem it has been taught that alloying elements with the lowest melting point will have the highest overpotential for hydrogen evolution. See *Comprehensive Treatise Of Electrochemistry*, Vol. 2, Chapter 1, Plenum Press (1981).

In spite of these prior disclosures there remains a need for an aluminum anode alloy which produces high voltages, high coulombic efficiency, and resists undesired release of hydrogen which causes gas blockage in the electrolyte passages.

SUMMARY OF THE PRESENT INVENTION

The present invention has met the above described need by providing a eutectic of low melting elements in an aluminum base alloy including at least two alloying elements selected from the group consisting of bismuth, cadmium, scandium, gallium, indium, lead, mercury, thallium, tin, and zinc. The preferred amounts of the alloying elements in the aluminum alloy are such that they are at least partially liquid when not combined with aluminum at the operating temperature at the local sights of reaction on the anode. The preferred compositions are the eutectic of the elements and are used in the battery anode.

The purity of the aluminum is preferably at least about 99.99%. Among the most preferred compositions are aluminum-gallium-indium, aluminum-gallium-indium-tin, aluminum-gallium-indium-tin-zinc, aluminum-gallium-indium-zinc, aluminum-gallium-zinc, aluminum-gallium-tin, and aluminum-bismuth-cadmium-indium-lead-tin.

It is an object of the present invention to provide an improved aluminum base alloy which can be used as an anode in a mechanically rechargeable battery.

It is an object of the present invention to provide an aluminum base alloy with high voltage characteristics.

It is an object of the present invention to provide an aluminum alloy with high coulombic efficiency.

It is an object of the present invention to provide a eutectic of low melting temperature elements in an aluminum alloy.

It is an object of the present invention to provide an aluminum base alloy with at least two elements selected from the group consisting of scandium, tin, gallium, indium, zinc, cadmium, mercury, thallium, and lead as alloying constituents.

It is an object of this invention to provide an economical aluminum alloy suitable for use as an anode with a caustic electrolyte.

It is an object of this invention to provide an economical aluminum alloy suitable for use as an anode with a saline electrolyte.

It is a further object of this invention to provide such an alloy and anode which resists undesired release of hydrogen and parasitic corrosion.

It is a further object of the invention to create such alloys and anodes which establish a high overpotential for water reduction by use of eutectic alloying elements.

These and other objects of the present invention will be more fully understood from the following description of the invention.

BRIEF DESCRIPTION OF THE DRAWING

The FIGURE is a schematic illustration of an embodiment of the invention wherein a molten anode is employed.

DESCRIPTION OF THE PREFERRED EMBODIMENTS

All references herein to percentages of a constituent present in an alloy are weight percent.

While in general it is contemplated that the present invention will be used primarily as an alloy for anodes in mechanically rechargeable batteries, such as aluminum air-batteries, the alloy may be used in a wide variety of other environments, such as in an emergency backup energy source, for example or as a sacrificial anode for cathodic protection. The alloy of the present invention is a lightweight galvanic material preferably used as an anode for a fuel cell.

It is preferred that the aluminum alloy be used as an anode in a battery. The battery preferably has a housing with an anode and cathode secured therein in relative spaced relationship by support means in any conventional or desired manner. A suitable electrolyte is employed.

In the preferred practice of this invention in order to achieve the objectives of the invention the alloying constituents are selected so as to provide eutectic combinations thereof.

Eutectic alloys are made up of at least two metals, besides the base metal aluminum, which are entirely soluble in each other when liquid, but insoluble in each other when in solid form. When in solid form the metals form different kinds of crystals or grains. The eutectic is not a homogeneous alloy, but consists of crystals of nearly pure elements. Therefore, when the metals freeze, crystals of individual metals form and there is no solid solution. The alloys of eutectic compositions melt and freeze at a constant temperature, in this respect, behaving as a pure metal.

In a preferred practice of the invention the mixture of alloying constituents is so selected that all, or at least some portions of the mixture alloying constituents (nonaluminum components of the alloy) will be in a melted or liquid state at a temperature at or under 200°

C. and most preferably at or under 100° C. In the preferred practice of the invention the nonaluminum alloying constituent which is present in the greatest amount will be present in a quantity within about ±5% of the eutectic quantity of that constituent in relation to the other constituents. Unless expressly indicated to the contrary at a specific location herein, alloying constituents satisfying either of these standards shall be deemed to be "eutectic" for purposes of this invention (as distinguished from the conventional absolute eutectic values).

The alloy of the present invention produces a high voltage, high coulombic efficiency with resistance to hydrogen release in an alkaline electrolyte. In a strongly alkaline water electrolyte, such as 4 molar or higher, the alloy exhibits an unexpectedly high efficiency. Sodium hydroxide, potassium hydroxide, caustic soda and the like may be used as an electrolyte. Optionally, sodium stannate may be added to the electrolyte.

Alternatively, the alloy of the present invention may be used in a saline water solution, such as ammonium chloride, ammonium bromide, potassium chloride, potassium bromide, sodium bromide, ammonium iodide, sodium iodide, potassium iodide, and mixtures thereof.

The aluminum alloy anode will typically have a thin coating of aluminum oxide on its surface which is in contact with the battery electrolyte. As the battery discharges in use aluminum will dissolve and diffuse through the anode into the electrolyte. This leaves behind the alloying constituents as they are less electrochemically active than aluminum. As the alloying constituents are selected so as to be in their eutectic state they will be in their liquid state at battery operating temperatures (either partially or entirely) thereby facilitating enhanced efficiency of aluminum diffusion. This solution or melted condition of the alloying constituents facilitates breaking up of the aluminum oxide film as the film will not be supported on a solid surface.

In order to achieve low parasitic corrosion of the aluminum alloy, the composition of the alloying elements should be established at a low level and have a low melting point. The amount of the composition range is determined by the ability of the aluminum to diffuse through the anode and be discharged from the surface of the alloy and thereby leave significant concentrations of the remaining elements behind.

It is preferred that the total concentration of alloying constituents be selected so as to provide a eutectic concentration with the total weight of the alloying constituents being about 0.01 to 2.0 percent and preferably about 0.05 to 0.2 percent of the weight of the alloy for the alloy to be employed with a caustic electrolyte and about 0.01 to 3.0 percent, preferably 0.05 to 0.4 percent for use in a saline electrolyte.

Aluminum is used in anode alloys because it is plentiful, relatively inexpensive, and possesses a high energy content. Pure aluminum, however, does not achieve sufficiently high potential to be employed alone. To increase the efficiency it is preferred that the purity of aluminum be at least about 99.99%. The increased purity leads to increased coulombic efficiency.

The most preferred alloying constituents are gallium, indium, and tin whether alloyed separately or in combinations with the aluminum. However, the other alloying elements such as bismuth, cadmium, scandium, lead, mercury, thallium, and zinc, for example, may also be used.

EXAMPLE 1

Tests were performed in order to test seven eutectic alloy anodes of the present invention having 0.1 percent alloying elements with the balance being aluminum having a purity of 99.99 percent. These were compared with pure aluminum (99.99 percent) both at open circuit potential and at a current density of 100 milliamps per square centimeter ($ma/cm^2$). The higher the potential (considered in an absolute sense by ignoring the negative sign) the better the performance of the alloy. The tests were performed in a saline electrolyte solution of 20% potassium chloride with measurements being made with respect to a saturated calomel electrode (S.C.E.).

The alloys identified in Table 1 are eutectic with the compositions being indicated as weight percent on the basis of total weight of alloying constituents.

Aluminum of a purity of 99.99% has an open circuit potential of −1.138 volts and a potential at 100 $ma/cm^2$ of −0.707 volts.

TABLE 1

| No. | Alloy | M.P. °C. | Open Circuit Potential vs. S.C.E. (volts) | Potential At 100 $ma/cm^2$ vs. S.C.E. (volts) |
|---|---|---|---|---|
| 1 | Ga:In (75.5:24.5) | 15.7 | −1.708 | −1.272 |
| 2 | Ga In Sn (62.0:25.0:13.0) | 5 | −1.669 | −1.275 |
| 3 | Ga In Sn Zn (61:25:13:1) | 3 | −1.719 | −1.261 |
| 4 | Ga In Zn (67:29:3) | 13 | −1.647 | −1.177 |
| 5 | Ga Sn (92:8) | 20 | −1.643 | −1.294 |
| 6 | Ga Zn (95:5) | 25 | −1.721 | −1.280 |
| 7 | Bi Cd In Pb Sn 46.8 (44.7:5.3:19.1:22.6:8.3) | 46.8 | −1.604 | −1.004 |

Alloys No. 1–6 had melting points for the eutectic in the range of about 3 to 25° C. while alloy No. 7 had a melting point of 46.8° C. All of them performed in a superior manner to 99.99% aluminum in both the open potential and polarized at 100 $ma/cm^2$ categories.

EXAMPLE 2

As not only output potential but resistance to parasitic corrosion are important to the present invention, tests were performed to determine corrosion resistance of selected alloys of the present invention. Alloy specimens made of the following alloys were tested in 4 molar sodium hydroxide with 0.06 M $Na_2SnO_3$ at 60° C. in flowing electrolyte. An air-cathode was used. Alloys No. 1–3 of Example 1 and a gallium-magnesium alloy (0.05:0.8) were tested.

TABLE 2

| Alloy | a (volts) | b (ohm-$cm^2$) | icorr ($ma/cm^2$) | icorr var. 95% Cl $ma/cm^2$ |
|---|---|---|---|---|
| No. 1 | −1.66 | 0.480 | 3.8 | 4 |
| No. 2 | −1.68 | 0.549 | 2.8 | 1 |
| No. 3 | −1.65 | 0.442 | 5.8 | 4 |
| Mg—Ga | −1.68 | 0.450 | 37.0 | Not Determined |

Polarization voltage was determined by the equation $V = a + bi$ and is valid in the range of about 100 to 800 $ma/cm^2$ anodic current densities, where V = the polarization voltage versus Hg/HgO resistance electrode at a current density of i, a=the volts versus Hg/HgO, b=resistance in ohm-cm$^2$, i=amps per cm$^2$, and icorr=the equivalent parasitic corrosion rate in ma/cm$^2$. The term "icorr var" is the variance in corrosion rate at a 95% confidence interval. In general, the precision of polarization measurement decreased with increasing current densities.

In each case the output voltage and corrosion rates were at desirable levels. Alloys No. 1-3 were similar in polarization to the tested commercially available Mg-Ga alloy but superior in parasitic corrosion rates.

EXAMPLE 3

Alloys No. 1-3 and BDW were used as anodes and tested against 99.99% aluminum. The BDW had a composition comprised of 0.8% magnesium, 0.1% indium, 0.15% manganese, and the balance 99.99% aluminum (See European Patent No. 209,402). Specimens of the alloys were tested in 5 M KOH with 1 mole dissolved in high purity aluminum at 60° C. in a flow through system. The voltages were all measured against a Hg/HgO reference electrode.

TABLE 3

|  | Alloy No. 1 | Alloy No. 2 | Alloy No. 3 | Pure Al (99.99%) | BDW |
| --- | --- | --- | --- | --- | --- |
| Open Circuit | 1.79 | 1.82 | 1.75 | 1.52 | 1.86 |
| 100 ma/cm$^2$ | 1.59 | 1.59 | 1.61 | — | — |
| 200 ma/cm$^2$ | 1.46 | 1.53 | 1.56 | 1.39 | 1.72 |
| 400 ma/cm$^2$ | 1.42 | 1.48 | 1.47 | 1.24 | 1.68 |
| 600 ma/cm$^2$ | 1.23 | 1.46 | 1.43 | 1.05 | 1.60 |

The polarization potentials of Alloys No. 1-3 were higher than the pure aluminum potential in the open circuit at each current density. The commercial BDW alloy had slightly higher polarization currents than Alloys No. 1-3, but also had undesired higher parasitic corrosion rates as shown at Table 4.

TABLE 4

| | Parasitic Corrosion (mg/cm$^2$ - min.) | | | | |
| --- | --- | --- | --- | --- | --- |
|  | Alloy No. 1 | Alloy No. 2 | Alloy No. 3 | Pure Al (99.99%) | BDW |
| Open Circuit | 0.86 | 0.10 | 0.10 | 1.14 | 0.12 |
| 100 ma/cm$^2$ | 0.09 | 0.09 | 0.14 | — | — |
| 200 ma/cm$^2$ | 0.06 | 0.10 | 0.13 | 0.60 | 0.16 |
| 400 ma/cm$^2$ | 0.15 | 0.09 | 0.10 | 0.17 | 0.32 |
| 600 ma/cm$^2$ | 0.12 | 0.07 | 0.08 | 0.04 | 0.28 |

Alloys No. 1-3 were substantially lower than pure aluminum and BDW in parasitic corrosion at all current levels.

The alloy of the present invention may be cast by melting aluminum at least about 1300° F. to 1400° F. in a graphite crystalline line with a liner that resists contamination from the crystal. The alloying elements are slowly added in any desired sequence. The molten alloy is stirred until the mixture is homogeneous, preferably for at least about an hour. The molten alloy is poured into a mold and allowed to cool and solidify. The ingot is removed from the mold. The ingot may be used as cast at this point. Alternatively, the ingot may be heat-treated at about 550° C. for about 4 to 24 hours, cold water quenched, and cold-rolled.

EXAMPLE 4

A number of alloy samples were tested as anodes. A number of alloys were tested in addition to those previously disclosed herein. All alloys were created with 99.9 to 99.99% pure aluminum. Alloy No. 8 comprised Sn-Ga (67:33). Alloy No. 9 comprised 0.1% Ga.

Table 5 reports tests performed employing as an electrolyte, a 20% potassium chloride water solution with measurement of voltages of E[0] open circuit potential and E[20] mlH$_x$/min-cm$^2$ which is the hydrogen evolution caused by the parasitic corrosion as compared with S.C.E. at a current density of 20 ma/cm$^2$.

TABLE 5

| Alloy | icorr (ma/cm$^2$) | E[0] | E[20] | mlH$_x$/min-cm$^2$ |
| --- | --- | --- | --- | --- |
| No. 8 | 9 | −1.5 | −1.48 | 0.2 |
| No. 9 | 3.2 | −1.43 | −1.23 | 0.07 |
| No. 5 | 4 | −1.48 | −1.45 | 0.08 |
| No. 1 | 11 | −1.65 | −1.44 | 0.23 |
| No. 2 | 15 | −1.67 | −1.47 | 0.32 |
| Pure Zinc | 0.5 | −1.4 | −1.2 | 0.01 |

All of the alloys tested in the tests reported in Table 5 were heat treated at 550° C. for 24 hours followed by a cold water quench. Alloy No. 5 performed best as it had the best combination of high operating potential and low parasitic corrosion. The operating potential for these alloys (Nos. 1, 2, 5, and 9) was better than pure zinc, but the corrosion rate for alloys (Nos. 1, 2, 5, and 9) was equal to or better than that of commercial alloy No. 8, but the operating potential was worse.

Table 6 displays the results of tests of Alloys No. 1, 2, and 3 of the invention and commercial alloys Mg-Ga and No. 8 (both described hereinbefore) and pure zinc. The electrolyte was 4 N NaOH with 0.06 M Na$_2$SnO$_3$ for the aluminum alloys and 7M KOH for pure zinc. While zinc cannot be discharged at 200 ma/cm$^2$ it is sufficiently stable that high surface area can be employed as an operating voltage of 1.4V is shown. The E[200] in Table 6 refers to potential versus Hg/HgO at a current density of 200 ma/cm$^2$. The open circuit potential is referenced against a Hg/HgO electrode. The test results show that Alloys No. 1, 2, and 3 have better parasitic corrosion than the Mg-Ga or No. 8 alloys, but the operating voltage was smaller. The parasitic corrosion is better for zinc than for the aluminum alloys. The operating voltages for the aluminum alloy is better than that of pure zinc.

TABLE 6

| Alloy | icorr (ma/cm$^2$) | E[0] | E[200] | mlH$_x$/min-cm$^2$ |
| --- | --- | --- | --- | --- |
| Mg—Ga | 54 | −1.87 | −1.58 | 1.2 |
| No. 8 | 20 | −1.88 | −1.605 | 0.44 |
| No. 1 | 9.5 | −1.82 | −1.54 | 0.21 |
| No. 2 | 7.2 | −1.82 | −1.57 | 0.16 |
| No. 3 | 9.4 | −1.82 | −1.53 | 0.20 |
| Pure Zinc | 0.05 | −1.5 | (−1.4) | 0.001 |

The battery of the present invention will generally have a housing, support means within said housing supporting an anode of the present invention in spaced relationship with respect to a cathode, and a suitable electrolyte.

Referring again to the FIGURE there is shown an alternate embodiment of the invention. In the previously discussed embodiments the anode will generally be in the form of a solid aluminum alloy composed of aluminum and at least two of the recited alloying constituents. In this embodiment of the invention the identical alloying elements will be present in a molten state and solid aluminum will be introduced into the molten alloying constituents and melt. The aluminum will diffuse through the eutectic-alloying constituent-electrolyte interface and be discharged as $Al^{+3}$.

As is shown in the FIGURE a reel 10 of aluminum wire 12 which may be of generally cylindrical configuration is advanced in the direction indicated by arrow A under the influence of a pair of gripping roller members 14, 16 which are power driven in the directions indicated on the rollers 14, 16. A housing 2 contains in its lower portion molten alloying constituents 8 and molten aluminum from portions of wire 12 introduced into housing 12. Any suitable sort of heat means, such as electrical resistance means, may be employed to maintain the alloying constituents in a molten state. When the solid aluminum wire 12 comes into contact with the molten alloying constituents as the wire 12 enters the housing 2 through opening 9 which provides suitable seal means such as sleeve 11 it will dissolve in the pool 8. Solid aluminum entering housing 2 in intimate contact with sealing collar 11 which can be made of a suitable refractory. The aluminum will migrate through the alloying constituents 8 into region 18 which underlies the electrolyte 4 and has an interface 20 therewith. $Al^{+3}$ will be released. In the form shown, an air-cathode 22 is provided within the electrolyte 4 in spaced relationship with respect to the alloying constituents 8 and 18 secured to housing 2 by any suitable support means 24. The air-cathode 22 or other suitable cathode serve to reduce the $O_2$ to $H_2O$. The electrolyte may preferably take the form of a strong caustic or saline solution.

This embodiment serves to eliminate the need to alloy the aluminum prior to discharge. It also has the advantage of providing a very high discharge rate for the aluminum as there is a large active area due to the large pool of eutectic elements. In lieu of wire, other forms of solid aluminum which are readily dissolved, such as foil, for example, may be employed.

The solid aluminum should be advanced into the housing at such a rate as to maintain the alloying elements at about 0.1 to 3.0 percent by weight of the anode. The rate of feed may readily be determined by one skilled in the art on the basis of the density of the aluminum, the physical dimensions of the solid wire, and Faraday's Law.

It will be appreciated, therefore, that a eutectic aluminum alloy having with certain preferred alloying elements such as scandium, zinc, gallium, cadmium, indium, tin, mercury, thallium, lead, and bismuth may be advantageously used as an anode in a caustic or in a saline electrolyte to achieve enhanced voltage, high coulombic efficiency, and minimal corrosion. More specifically, it is preferred that gallium, indium, tin, zinc, bismuth, cadmium, thallium, or lead be added in eutectic amounts in order to produce these characteristics.

While numerous examples of preferred alloys have been provided herein, it will be appreciated that those skilled in the art can readily, as to specific alloying components, employ a phase diagram or other means to select compositions which will be eutectic within the meaning of the present invention.

Whereas particular embodiments of the invention have been described above for purposes of illustration, it will be appreciated by those skilled in the art that numerous variations of the details may be made without departing from the invention as described in the appended claims.

I claim:

1. An aluminum alloy comprising eutectic amounts of at least two alloying elements selected from the group consisting of bismuth, cadmium, scandium, gallium, indium, lead, mercury, thallium, tin, and zinc with the balance being aluminum and said alloying elements being about 0.01 to 3.0 percent by weight of said alloy.

2. The aluminum alloy of claim 1, including, said alloying elements including at least two elements selected from the group consisting of gallium, indium, tin, and zinc; and said alloying elements being about 0.05 to 0.4 percent by weight of said alloy.

3. The aluminum alloy of claim 1, including all or at least a portion of the mixture of said alloying elements having a melting point such that at least some of them will be liquid at a temperature at or under 200° C.

4. The aluminum alloy of claim 1, including all or at least a portion of the mixture of said alloying elements having a melting point such that at least some of them will be liquid at a temperature at or under 100° C.

5. The aluminum alloy of claim 1, including said alloying elements having the combination of these elements present within ±5 percent of the absolute eutectic amounts of such elements.

6. The aluminum alloy of claim 1, including said alloy having eutectic amounts of gallium and indium.

7. The aluminum alloy of claim 1, including said alloy having eutectic amounts of gallium, indium, and tin.

8. The aluminum alloy of claim 1, including said alloy having eutectic amounts of gallium, indium, tin, and zinc.

9. The aluminum alloy of claim 1, including said alloy having eutectic amounts of gallium and tin.

10. The aluminum alloy of claim 1, including said alloy having eutectic amounts of gallium, indium, and zinc.

11. The aluminum alloy of claim 1, including said alloy having eutectic amounts of gallium and zinc.

12. The aluminum alloy of claim 1, including said alloy having eutectic amounts of at least bismuth, cadmium, indium, lead, and tin.

13. An aluminum alloy anode comprising eutectic amounts of at least two alloying elements selected from the group consisting of bismuth, cadmium, scandium, gallium, indium, lead, mercury, thallium, tin, and zinc with the balance being aluminum and said alloying elements being about 0.01 to 3.0 percent by weight of said alloy.

14. The aluminum anode of claim 13, including, said alloying elements including at least two elements selected from the group consisting of gallium, indium, tin, and zinc; and said alloying elements being about 0.05 to 0.4 percent by weight of said alloy.

15. The aluminum anode of claim 13, including all or at least a portion of the mixture of said alloying elements having a melting point such that at least some of them will be liquid at a temperature at or under 200° C.

16. The aluminum anode of claim 13, including all or at least a portion of the mixture of said alloying elements having a melting point such that at least some of them will be liquid at a temperature at or under 100° C.

17. The aluminum anode of claim 13, including said alloying elements having the combination of these elements present within ±5 percent of the absolute eutectic amounts of such elements.

18. The aluminum anode of claim 13, including said alloy having eutectic amounts of gallium, indium, tin, and zinc.

19. The aluminum anode of claim 13 including said alloy having eutectic amounts of gallium and indium.

20. The aluminum anode of claim 13, including said alloy having eutectic amounts of gallium, indium, and tin.

21. The aluminum anode of claim 13, including said alloy having eutectic amounts of gallium, indium, and zinc.

22. The aluminum anode of claim 13, including said alloy having eutectic amounts of gallium and tin.

23. The aluminum anode of claim 13, including said alloy having eutectic amounts of gallium and zinc.

24. The aluminum anode of claim 13, including said alloy having eutectic amounts of bismuth, cadmium, indium, lead, and tin.

25. A battery comprising:
a housing;
an anode disposed within said housing;
a cathode disposed within said housing and in a spaced relationship with said anode;
support means for securing said anode and said cathode within said housing;
said anode being an aluminum anode comprising eutectic amounts of at least two alloying elements selected from the group consisting of bismuth, cadmium, scandium, gallium, indium, lead, mercury, thallium, tin, and zinc with the balance being aluminum; and
said alloying elements being about 0.01 to 3.0 percent by weight of said alloy.

26. The battery of claim 25, including,
said alloying elements including at least two elements selected from the group consisting of gallium, indium, tin, and zinc; and
said alloying elements being about 0.05 to 0.4 percent by weight of said alloy.

27. The battery of claim 25, including
all or at least a portion of the mixture of said alloying elements having a melting point such that at least some of them will be liquid at a temperature at or under 200° C.

28. The battery of claim 25, including
all or at least a portion of the mixture of said alloying elements having a melting point such that at least some of them will be liquid at a temperature at or under 100° C.

29. The battery of claim 25, including
said alloying elements having the combination of the elements present within ±5 percent of the absolute eutectic amounts of such elements.

30. The battery of claim 25, including said alloy having eutectic amounts of gallium, indium, tin, and zinc.

31. The battery of claim 25, including said alloy having eutectic amounts of gallium and indium.

32. The battery of claim 25, including said alloy having eutectic amounts of gallium, indium, and tin.

33. The battery of claim 25, including said alloy having eutectic amounts of gallium, indium, and zinc.

34. The battery of claim 25, including said alloy having eutectic amounts of gallium and tin.

35. The battery of claim 25, including said alloy having eutectic amounts of gallium, indium, and zinc.

36. The battery of claim 25, including said alloy having eutectic amounts of gallium and zinc.

37. The battery of claim 25, including said alloy having eutectic amounts of bismuth, cadmium, indium, lead, and tin.

38. A battery comprising
a housing;
an anode disposed within said housing;
a cathode disposed within said housing in spaced relationship with respect to said anode;
said anode being an aluminum anode comprising eutectic amounts of at least two alloying elements selected from the group consisting of bismuth, cadmium, scandium, gallium, indium, lead, mercury, thallium, tin, and zinc with the balance being aluminum; and
said alloying elements and said aluminum being in a molten state.

39. The battery of claim 38, including
means for introducing said aluminum into said housing in a solid state prior to dissolving said aluminum in said alloying elements.

40. The battery of claim 39, including said aluminum being in an elongated form prior to introduction into said housing.

41. The battery of claim 40, including said aluminum being in wire form prior to introduction into said housing.

42. The battery of claim 41, including said electrolyte disposed in overlying relationship with respect to said anode, and said cathode disposed within said electrolyte.

43. The battery of claim 45, including said means for feeding said solid aluminum into said housing at a rate which will maintain said alloying elements at about 0.1 to 3.0 percent by weight of said anode.

* * * * *